United States Patent Office 3,203,958
Patented Aug. 31, 1965

3,203,958
PROCESS FOR THE PRODUCTION OF 2-HALO-GENATED AROMATIC THIAZOLE CARBOXYLIC ACID HALIDES
Istvan Hari and Walter Jenny, Basel, Switzerland, assignors to Ciba Limited, Basel, Switzerland, a company of Switzerland
No Drawing. Filed May 31, 1962, Ser. No. 198,728
Claims priority, application Switzerland, June 9, 1961, 6,747/61; Apr. 13, 1962, 4,595/62
2 Claims. (Cl. 260—304)

2-chloro-benzthiazole-5-carboxylic acid chloride of the formula

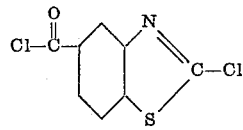

has been described in the literature. In Example 3 of the French specification No. 673,622, filed on April 20, 1929, by I. G. Farbenindustrie A.G., it is stated that 2-chloro-benzthiazole-5-carboxylic acid chloride is obtained by using somewhat more than two molecular proportions of phosphorus pentachloride for reaction with 2-mercapto-benzthiazole-5-carboxylic acid. This is not in accordance with the facts, because, when the reaction is carried out under the conditions specified, a compound containing 28% of sulfur is obtained, instead of the anticipated 13.8% thereof.

The present invention is based on the observation that 2-halogenated thiazole carboxylic acid halides of the aromatic series are obtained by treating an aromatic thiazole carboxylic acid that contains a hydroxyl or mercapto group in the 2-position with an acid-halogenating agent in the presence of an N-alkyl-pyrrolidone, but especially in the presence of a formamide.

As acid-halogenating agent there are advantageously used phosphorus pentahalides, such as phosphorus pentachloride, in the presence of a corresponding oxychloride.

As an N-alkyl-pyrrolidone there is used, more especially, N-methyl-pyrrolidone. However, it is preferable to use a dialkylated formamide, such as dimethyl- or diethyl-formamide or the corresponding thioformamides.

As thiazole carboxylic acids of the aromatic series that contain a hydroxyl or mercapto group in the 2-position, there may be menitoned those of the diphenyl and naphthalene series, but especially benzthiazole-5-, -6- and -7-carboxylic acids.

The reaction with the acid-halogenating agent is advantageously carried out in an open vessel or under pressure at a raised temperature, for example, at a temperature above 90° C., and advantageously at the boiling point of the reaction mixture. The proportion of the dialkylformamide used may vary within wide limits, but it should not be less than 0.5 of one equivalent (calculated on the amount of the acid used). The dialkylformamide apparently takes part in the reaction, that is to say, it does not appear to act as a catalyst, since by using 0.5 of one equivalent of dimethyl-formamide a monosulfido-dicarboxylic acid chloride of the formula

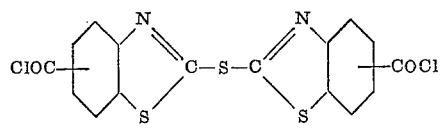

is obtained. The complete replacement of the sulfur atom in the 2-position takes place only with the use of one or more than one equivalent of dimethyl-formamide, with the formation of a 2-chloro-benzthiazole-carboxylic acid chloride.

The carbozylic acid halides obtained by the process of the invention are valuable compounds which, owing to their numerous reactive positions, are useful in organic chemistry for a wide variety of purposes. Thus, for example, they can be used as acylating agents in the manufacture of dyestuffs.

The following examples illustrate the invention, the parts and percentages being by weight unless otherwise stated, and the relationship of parts by weight to parts by volume being the same as that of the kilogram to the liter:

Example 1

3.5 parts of 2-mercapto-benzthiazole-6-carboxylic acid are mixed with 11 parts of phosphorus pentachloride, 70 parts of phosphorus oxychloride and 8 parts of dimethyl-formamide, and the mixture is stirred for 3 hours at 105° C. The excess phosphorus oxychloride is distilled off in vacuo, and the residue so obtained is extracted three times, with 75 parts of hot dry benzene each time at about 80° C. The crude acid chloride obtained after distillation of the benzene from the combined benzene solutions, can be purified by recrystallization from ligroin in the presence of active carbon.

The 2-chloro-benzthiazole-6-carboxylic acid chloride, which is obtained in excellent yield, crystallizes in the form of long colorless needles melting at 151° C. The methyl ester obtained by boiling the acid chloride in methanol has the formula

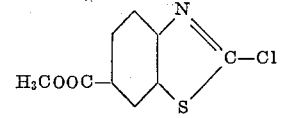

melts at 131° C., and has a chlorine content of 15.50% (calculated for $C_9H_6O_2NSCl=15.57$).

By using dimethyl-thioformamide, instead of dimethly-formamide, in the process described in the first paragraph of this example the same end product is obtained in a similarly good yield.

If the process of this example is carried out without the use of dimethyl-formamide, there is obtained a carboxylic acid chloride that melts at 183 to 184° C. and forms a methyl ester of the formula

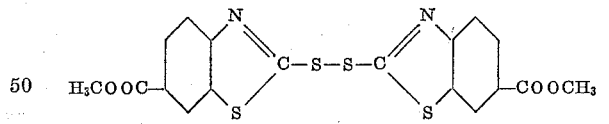

that melts at 229 to 230° C. and has a sulfur content of 29.70%.

If only 0.5 of one equivalent (0.6 part) of dimethyl-formamide is used in the process described in the first paragraph of this example, the product obtained is the monosulfide of the dicarboxylic acid dichloride, the dimethyl ester of which has the formula

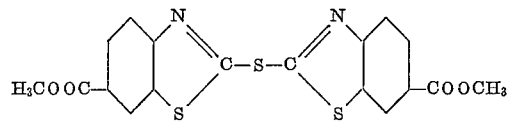

and melts at 225° C., and has a sulfur content of 23.1%.

The 2-mercapto-benzthiazole-6-carboxylic acid used as starting material can be prepared as follows:

3.8 parts of 5-carboxy-2-amino-thiophenol hydrochloride are dissolved in 30 parts of ethanol of 75% strength, which contains 1.72 parts of sodium hydroxide. 3.1 parts of carbon disulfide are then added and the whole is boiled under reflux for 12 hours. The solution is cooled to 10° C., adjusted to a pH·value of 4 with glacial acetic acid, and the precipitate so obtained is filtered off with suction, washed with a small amount of ethanol, and dried. 2-mercapto-benzthiazole-6-carboxylic acid is obtained in excellent yield in the form of small white crystals that melt at 313° C. with decomposition.

Example 2

3.5 parts of 2-mercapto-benzthiazole-5-carboxylic acid are reacted with phosphorous pentachloride in the presence of phosphorous oxychloride and dimethyl-formamide in the manner described in the first paragraph of example 1. 2-chloro-benzthiazole-5-carboxylic acid chloride, which is obtained in very good yield, has the formula

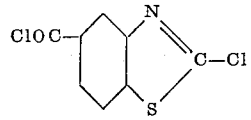

and crystallizes from ligroin in the form of long, colorless needles melting at 131° C.

The methyl ester obtained by boiling the product in methanol melts at 151 to 153° C. and has a chlorine content of 15.90% (calculated for $C_9H_6O_2NCl$.15.5%).

By following the procedure described in the first paragraph of this example, but without using the dimethyl-formamide, a dicarboxylic acid dichloride melting at 260° C. is obtained, the dimethyl ester of which melts at 262° C.

By using a half of one equivalent of dimethyl-formamide in the procedure described in the first paragraph of this example, a monosulfido-dicarboxylic acid dichloride melting at 247° C. is obtained, the dimethyl ester of which melts at 245 to 246° C.

Example 3

3.5 parts of 2-mercapto-benzthiazole-7-carboxylic acid are reacted with phosphorus pentachloride in phosphorus oxychloride and dimethyl-formamide in the manner described in the first paragraph of Example 1. The 2-chloro-benzthiazole-7-carboxylic acid chloride, which is obtained in very good yield, has the formula

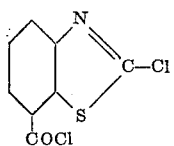

and crystallizes from ligroin in the form of long, colorless needless melting at 124° C.

By the process described in the preceding paragraph, but without using the dimethyl-formamide, a dicarboxylic acid dichloride melting at 222 to 227° C. is obtained, the dimethyl ester of which melts at 213 to 215° C.

By using a half of one equivalent of the dimethyl-formamide in the procedure described in the first paragraph of this example, a monosulfido-dicarboxylic acid dichloride melting at 253 to 255° C. is obtained, the dimethyl ester of which melts at 198° C.

The 2-mercapto-benzthiazole-7-carboxylic acid used as starting material can be prepared in the following manner:

4 parts of 2-amino-7-carbethoxy-benzthiazole [R. P. Veltman, Ukrain. Khim. Zhur., 22, 363 (1956)] are suspended in a solution of 18 parts of potassium hydroxide in 18 parts of water, and the mixture is boiled under reflux for 10 hours. The solution so obtained is cooled, cautiously neutralized with 8.5 parts by volume of concentrated hydrochloric acid, diluted with a mixture of 75 parts of ethanol and 40 parts of water, treated with 6.2 parts of carbondisulfide, stirred for 12 hours at 65° C., filtered, cooled, and adjusted to a pH-value of 4 with glacial acetic acid. The 2-mercapto-benzthiazole-7-carboxylic acid thus precipitated is filtered with suction, washed with a small amount of ethanol and dried. The crystalline product so obtained melts at 321 to 322° C. with decomposition.

What is claimed is:

1. A process for the production of 2-halogenated-arylene-4-,5-thiazol-carboxylic acid halide, wherein arylene-4,5-thiazol-carboxylic acid which contains a member selected from the group consisting of a mercapto and a hydroxyl group in the 2-position is reacted with an acid-halogenating agent in the presence of at least one equivalent of a member selected from the group consisting of N,N-di-lower alkyl formamides, N,N-di-lower alkyl thioformamides and N-lower alkyl-pyrrolidones.

2. A process as claimed in claim 1, wherein the starting material used is a member selected from the group consisting of benzthiazole-5-carboxylic acid, benzthiazole-6-carboxylic acid and benzthiazole-7-carboxylic acid containing a mercapto group in the 2-position.

References Cited by the Examiner
UNITED STATES PATENTS

| | | | |
|---|---|---|---|
| 1,661,998 | 3/28 | Carson | 260—306.5 |
| 1,878,699 | 9/32 | Hentrich et al. | 260—304 |
| 2,043,948 | 6/36 | Clifford | 260—204 |
| 2,862,000 | 11/58 | Heininger et al. | 260—306.6 |
| 2,868,800 | 1/59 | Korman | 260—306.6 |

FOREIGN PATENTS

| | | |
|---|---|---|
| 553,871 | 1/57 | Belgium. |

OTHER REFERENCES

Elderfield, Heterocyclic Compounds, vol. 6 (New York, 1957), pages 541–544, 623–634, and 562–571.

NICHOLAS S. RIZZO, *Primary Examiner.*

WALTER A. MODANCE, *Examiner.*